US006867730B2

United States Patent
Gottwald et al.

(10) Patent No.: US 6,867,730 B2
(45) Date of Patent: Mar. 15, 2005

(54) METHOD OF INTERFERENCE SUPPRESSION IN A RADAR DEVICE AND A RADAR DEVICE

(75) Inventors: Frank Gottwald, Rutesheim (DE); Klaus Voigtlaender, Wangen (DE); Tore Toennesen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/080,650

(22) Filed: Feb. 22, 2002

(65) Prior Publication Data
US 2002/0130810 A1 Sep. 19, 2002

(30) Foreign Application Priority Data
Feb. 22, 2001 (DE) .......................................... 101 08 584

(51) Int. Cl.[7] .............................................. G01S 7/292
(52) U.S. Cl. ........................ 342/159; 342/70; 342/162
(58) Field of Search ................................ 342/159, 137, 342/161–162, 168, 18

(56) References Cited

U.S. PATENT DOCUMENTS

| 3,979,752 | A | * | 9/1976 | Charlot ......................... 342/92 |
| 4,040,057 | A | * | 8/1977 | Cross et al. ................. 342/159 |
| 4,387,373 | A | * | 6/1983 | Longuemare, Jr. ........... 342/25 |
| 4,717,917 | A | * | 1/1988 | Alitz ........................... 342/137 |
| 4,914,441 | A | * | 4/1990 | Brookner ..................... 342/161 |
| 5,109,231 | A | * | 4/1992 | Olsson ........................ 342/145 |
| 5,537,117 | A | * | 7/1996 | Rose ............................ 342/17 |
| 5,764,697 | A | * | 6/1998 | Sakuma et al. ............. 375/239 |
| 6,049,302 | A | * | 4/2000 | Hinckley, Jr. ................ 342/99 |
| 6,049,561 | A | * | 4/2000 | Pezzlo et al. ................ 375/132 |
| 6,148,020 | A | * | 11/2000 | Emi ............................ 375/132 |

* cited by examiner

Primary Examiner—Thomas H. Tarcza
Assistant Examiner—Isam Alsomiri
(74) Attorney, Agent, or Firm—Kenyon & Kenyon

(57) ABSTRACT

A radar device and a method of suppressing interference in a radar device in which signals are transmitted with a carrier frequency, and the signals are transmitted as pulsed signals with a pulse repetition frequency, the pulse repetition frequency or the carrier frequency being varied during operation of the radar device.

9 Claims, 5 Drawing Sheets

METHOD OF INTERFERENCE SUPPRESSION IN A RADAR DEVICE AND A RADAR DEVICE

FIELD OF THE INVENTION

The present invention relates to a method of interference suppression in a radar device in which signals are transmitted with a carrier frequency, and signals that are pulsed with a pulse repetition frequency are transmitted. The present invention also relates to a radar device having an arrangement configured to transmit signals with a carrier frequency and an arrangement configured to pulse the signals with a pulse repetition frequency.

BACKGROUND INFORMATION

There are numerous applications for radar devices in various fields of industry. For example, the use of radar sensors is possible for short-range sensors in motor vehicles.

Essentially, a transmitting antenna in such radar devices emits electromagnetic waves. When these electromagnetic waves strike an obstacle, they are reflected and received by another antenna or the same antenna after being reflected. The received signals are then sent to a signal processing and analyzing unit.

In motor vehicles, for example, radar sensors are used for measuring the distance from targets and/or the relative velocity with respect to such a target outside the motor vehicle. Targets include, for example, parked vehicles or vehicles driving in front, pedestrians, cyclists or devices in the vicinity of the vehicle.

FIG. 1 is a schematic block diagram of a radar device having a correlation receiver according to the related art. A transmitter 300 is prompted by a pulse generator 302 to send a transmission signal 306 over antenna 304. Transmission signal 306 also strikes a target object 308, where it is reflected. Reception signal 310 is received by antenna 312. This antenna 312 may be identical to antenna 304. After receiving reception signal 310 by antenna 312, the signal is sent to receiver 314 and then supplied over a unit 316 having a low-pass filter and analog-digital converter to a signal analyzer 318. The special feature of this correlation receiver is that receiver 314 receives a reference signal 320 from pulse generator 302. Reception signals 310 received by receiver 314 are mixed with reference signal 320 in receiver 314. Using the correlation it is possible to determine, for example, the distance of a target object on the basis of the time lag from sending to receiving the radar pulses.

With ordinary pulsed radar devices, both the mid-frequency and the pulse repetition frequency are preselected as fixed frequencies. In particular in conjunction with special approval regulations, these fixed preset quantities may result in unacceptably high levels. Likewise, such devices are highly sensitive to interference.

SUMMARY

According to a first example embodiment, the present invention is based on a method in that the pulse repetition frequency is varied during operation of the radar device. In this manner, it is possible to eliminate the above-mentioned disadvantages. In particular, interference may be eliminated by varying the pulse repetition frequency.

It is possible to vary the carrier frequency during operation of the radar device. This is another possibility for eliminating a wide variety of types of interference.

In an example embodiment of the present invention, the pulse repetition frequency is varied deterministically. For example, it may be varied by using four different pulse repetition frequencies in a fixed order over fixed periods of time.

However, it is also possible for the pulse repetition frequency to be varied chaotically. This may be a safe method of variation, which may be advantageous with regard to potential intentional radar interference.

The carrier frequency may be varied by phase modulation. This is a suitable method of varying the transmitted signals, so that ultimately interference may be suppressed.

Comparable advantages may be obtained by varying the carrier frequency by frequency modulation.

The carrier may even be suppressed by a suitable modulation index.

In the case when the carrier frequency is varied by frequency modulation, a virtual intermediate frequency may be created by mixing the received signal with the modulated carrier frequency, and the received signal may be analyzed at the virtual intermediate frequency. Side lines are created in the carrier frequency by modulation of the carrier frequency with a modulation frequency. The distance between these side lines corresponds to the modulation frequency. If the received signal is then mixed with the modulated carrier frequency, mixing may also occur on these side lines. The useful signal, which is a pulse spectrum in the present case, thus also appears on the side lines. If we now consider such a side line with the help of a band-pass filter, this signal may be analyzed instead of the signal at a frequency of 0. Although the signal at the modulation frequency has a lower amplitude, the noise in a receiver is essentially in inverse ratio to the frequency. An analysis at a frequency of 0 thus produces a high noise level in the receiver, whereas an analysis at the virtual intermediate frequency, e.g., at 50 kHz, results in a reduced noise level.

In addition, it is also possible to use the sudden frequency change method for varying the carrier frequency. The sudden frequency change method, phase modulation and frequency modulation may also be used in a mixed method. In selecting the modulation frequency and the deviation in the sudden frequency change method, it may be important to be sure that the modulation frequency and the deviation frequency are greater than the pulse repetition frequency.

According to a second example embodiment, the present invention is based on the method in that the carrier frequency is varied during operation of the radar device. Thus, the carrier frequency is not varied in addition to the pulse repetition frequency. Instead, the radar interference may be adequately suppressed by varying the carrier frequency.

In the first example embodiment, the present invention is based on the radar device in that an arrangement is provided to vary the pulse repetition frequency during operation. Interference may be eliminated during operation by varying the pulse repetition frequency.

Furthermore, an arrangement configured to vary the carrier frequency during operation may also be provided. This is another possibility for eliminating various types of interference.

The pulse repetition frequency may be varied deterministically. Different pulse repetition frequencies may be used in a fixed order over a fixed period of time, for example.

In another example embodiment, however, chaotic variation of the pulse repetition frequency may be provided.

The radar device may be refined by varying the carrier frequency by phase modulation. This is an example modulation method with which interference may ultimately be suppressed.

The carrier frequency may be varied by frequency modulation.

In another example embodiment of the radar device according to the present invention, the carrier frequency is varied by frequency modulation. A virtual intermediate frequency is created by mixing the received signal with the modulated carrier frequency, and the received signal is analyzed at the virtual intermediate frequency. Thus, although working with a signal of a lower intensity, there may be advantages in analysis at the intermediate frequency because of the lower receiver noise.

In another example embodiment, the carrier frequency may be varied by a sudden frequency change method. The various modulation methods, i.e., phase modulation and frequency modulation, may also be used in combination. Likewise, they may also be combined with a sudden frequency change method. It may be important for the modulation frequency and the deviation frequency to be greater than the pulse repetition frequency in order to avoid gaps.

According to a second example embodiment, the radar device according to the present invention is based on the radar device due to the fact that an arrangement configured to vary the carrier frequency during operation is provided. It may not be absolutely necessary to vary the carrier frequency in addition to the pulse repetition frequency. Instead, radar interference may be suppressed adequately by varying the carrier frequency.

The present invention is based on the finding that transmission properties which conform even to strict approval requirements may be produced by varying the midfrequency and/or the pulse repetition frequency. Furthermore, it is thus possible to make available interference-suppressed radar, the functioning of which is not susceptible to either intentional or unintentional interference.

DETAILED DESCRIPTION

Figure 1:
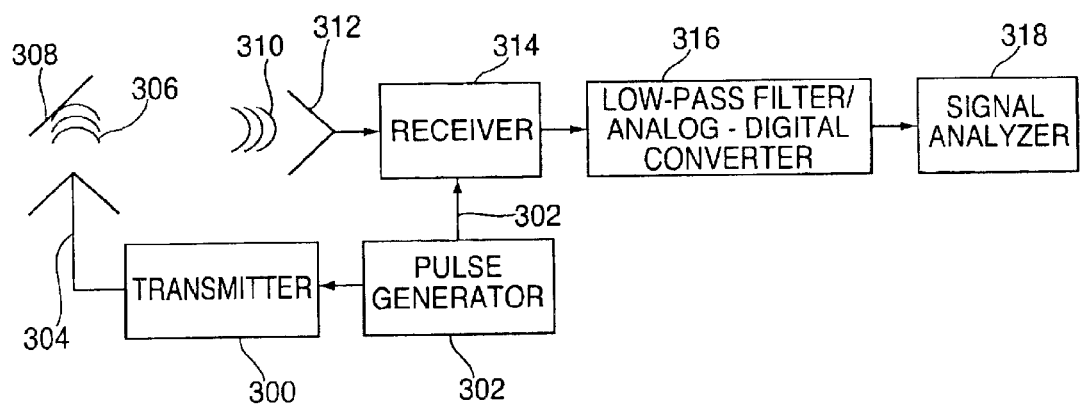
FIG. 1 is a schematic block diagram of a correlation receiver according to the related art.
Figure 2:
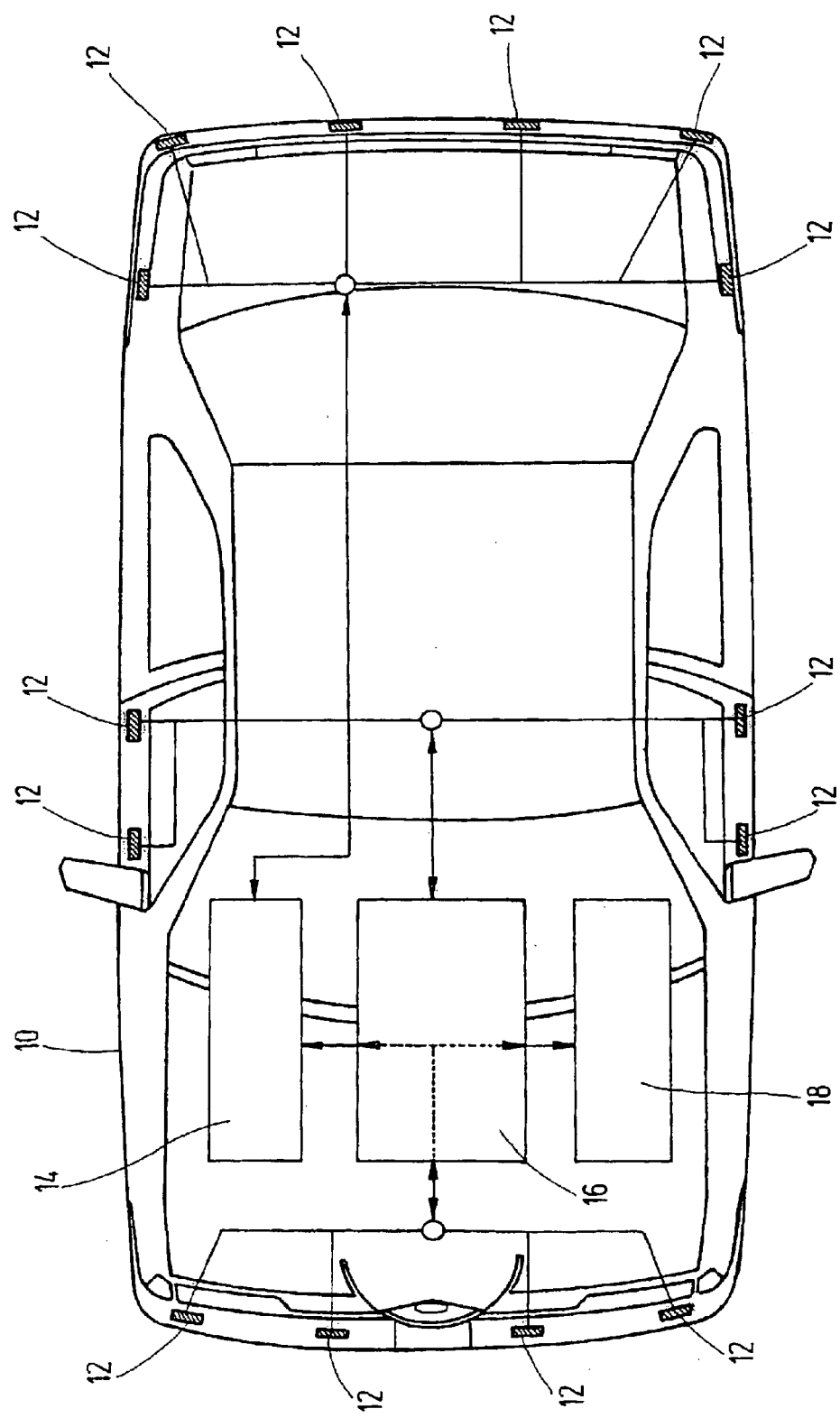
FIG. 2 illustrates an example of an arrangement of radar sensors on a motor vehicle.

FIG. 2 illustrates a motor vehicle 10 on which are arranged multiple radar sensors 12. The radar sensors are connected to one another over a bus concept and to control and monitoring units, in particular a unit 14, which is provided for supplying a parking aid and for detection of a blind spot, a unit 16 for the precrash function and a unit 18 for stop and go.

Figure 3:
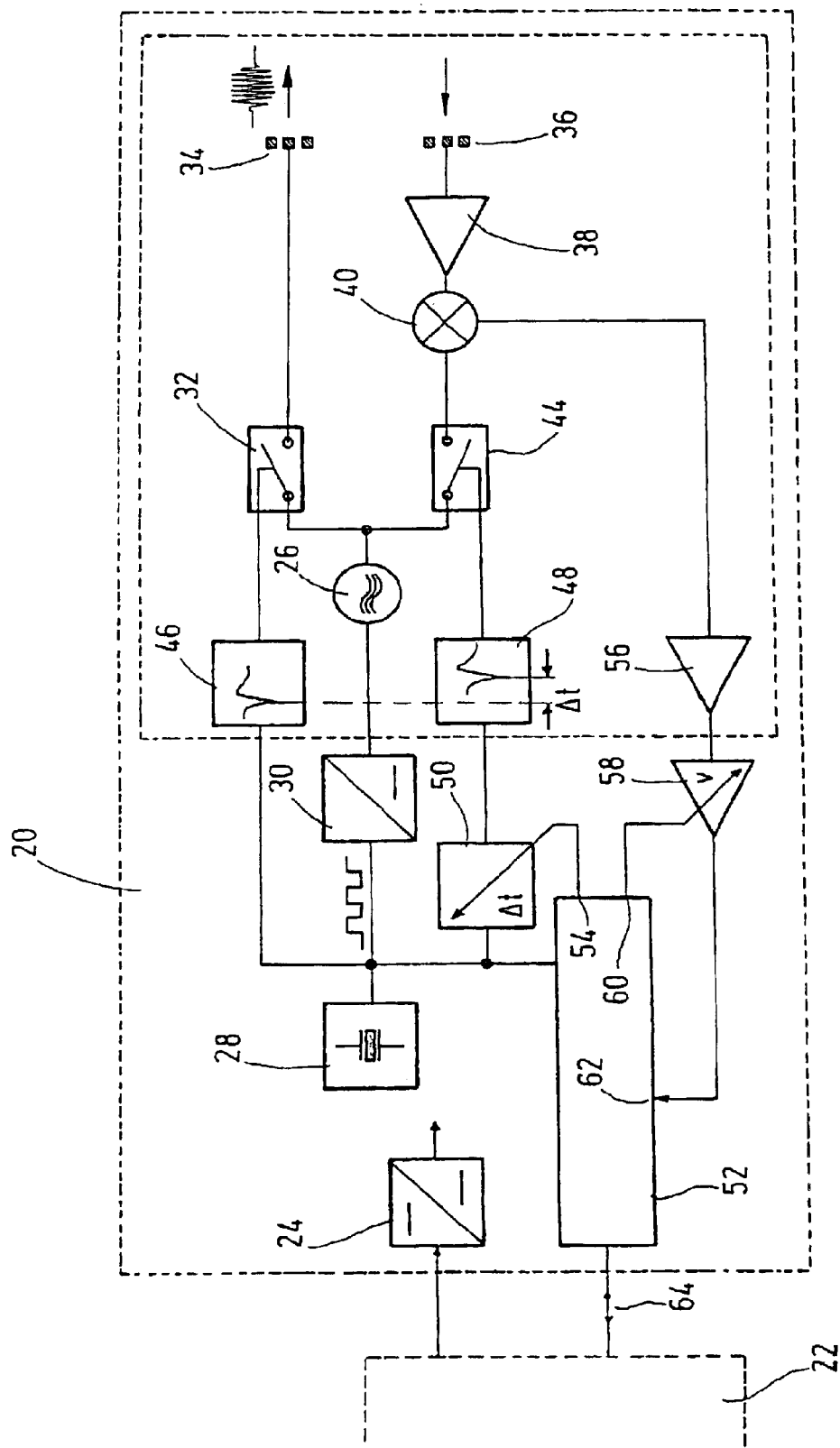
FIG. 3 is a schematic block diagram of a radar device.

FIG. 3 illustrates schematically the configuration of a sensor 20 which is used in short-range radar. A voltage, e.g., 8 V, is supplied to sensor 20 by an electronic control unit 22. This voltage is transformed in a DC-DC transformer, so that ultimately the power supply voltage, e.g., 5 V, is made available for the sensor components. A carrier frequency of 24 GHz, for example, is supplied by a local oscillator 26. This local oscillator 26 is supplied with a bias voltage, which is ultimately generated by a transformer 30 from pulses supplied by a clock pulse generator 28. The pulses generated by clock pulse generator 28 may have a frequency of 5 MHz, for example, and are used for modulation of carrier signals supplied by local oscillator 26. This modulation is performed in the transmission branch by a switch 32, which is switched by a pulse shaper 46. Pulse shaper 46 is in turn controlled by the clock frequency of clock pulse generator 28. The pulsed signals generated in this manner are sent out by antenna 34. In the case of reflection of the signals sent out by antenna 34, they are received by receiving antenna 36. After amplification of the received signals in an amplifier 38, the signals are sent to a mixer 40. In mixer 40, the received signals are mixed with the pulsed signals of local oscillator 26, with this pulsing occurring over a switch 44. The switch is controlled by a pulse generator 48 which outputs pulses delayed by a time delay $\Delta t$ with respect to the pulses output by pulse generator 46. This time delay is supplied by a time-delay circuit 50. The time delay of time-delay circuit 50 is influenced by a microcontroller 52 which has a digital signal processor. This occurs through a first analog output 54 of microcontroller 52. The output signals of mixer 40, which are processed by an amplifier 56, are influenced by further variable amplification in amplifier 58. This variable amplifier 58 is influenced by a second analog output 60 of microcontroller 52. The output signal of variable amplifier 58 is sent to an analog input 62 of microcontroller 52. Microcontroller 52 communicates with electronic control unit 22 over an input-output bus 64 (I/O bus).

Figure 4:
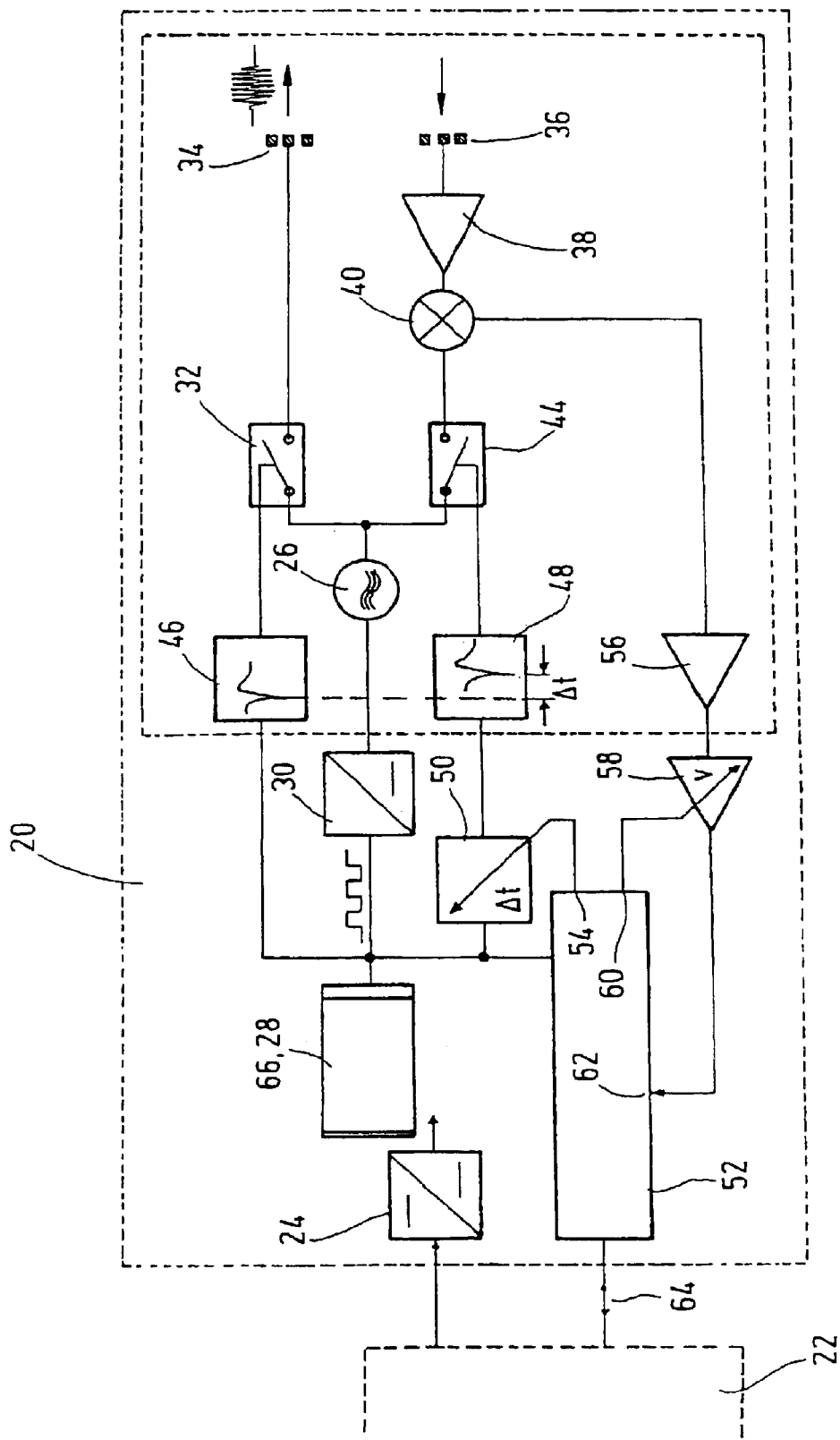
FIG. 4 is a schematic block diagram of a radar device having a variable pulse repetition frequency.

FIG. 4 is a block diagram of a radar device which corresponds largely to the block diagram illustrated in FIG. 3. Additionally, an arrangement 66 configured to vary the pulse repetition frequency is also provided. Thus, it is possible for the radar device to have interference suppression on the basis of a variation in the pulse repetition frequency.

Figure 5:
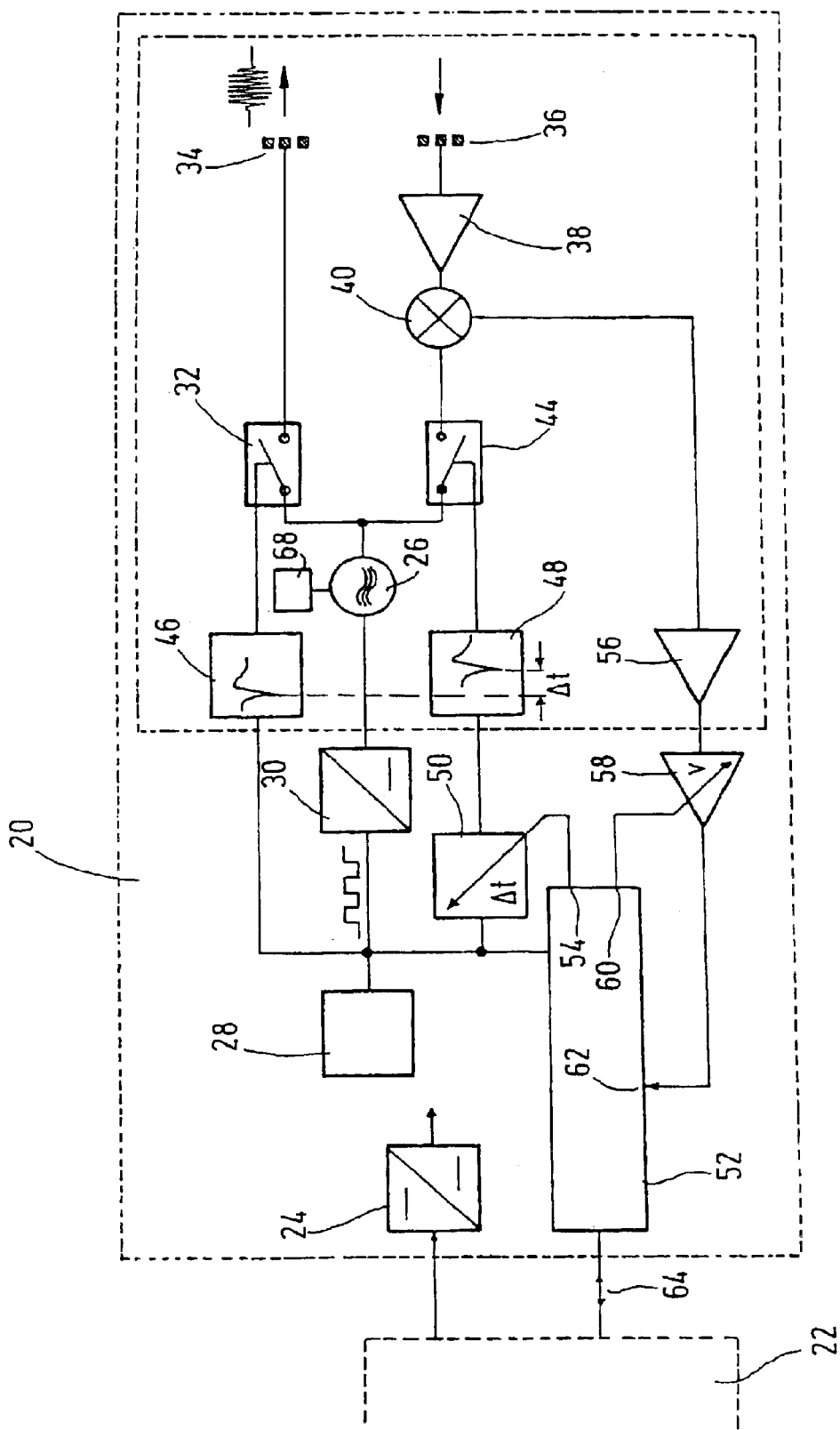
FIG. 5 is a schematic block diagram of a radar device having a variable carrier frequency.

FIG. 5 also corresponds largely to FIG. 3, where an arrangement 68 configured to modulate the carrier frequency is also provided. This method also makes it possible to suppress noise in this radar device.

In another example embodiment, the example embodiments illustrated in FIG. 4 and FIG. 5 may be combined, i.e., both the pulse repetition frequency and the carrier frequency are modulated.

The preceding description of example embodiments according to the present invention is presented only for the purpose of illustration and does not limit the scope of the present invention. Various changes and modifications are possible without going beyond the scope of the present invention or its equivalents.

What is claimed is:

1. A method of suppressing interference in a radar device, comprising the steps of:
   transmitting signals with a carrier frequency;
   transmitting the signals as pulsed signals with a pulse repetition frequency;
   varying the pulse repetition frequency during operation of the radar device, wherein the pulse repetition frequency is varied chaotically in the pulse repetition frequency varying step; and
   varying the carrier frequency during operation of the radar device.

2. The method according to claim 1, wherein the carrier frequency is varied in the carrier frequency varying step by phase modulation.

3. The method according to claim 1, wherein the carrier frequency is varied in the carrier frequency varying step by frequency modulation.

4. The method according to claim 1, further comprising the steps of:

varying the carrier frequency by frequency modulation;

producing a virtual intermediate frequency by mixing a received signal with the modulated carrier frequency; and analyzing a received signal at the virtual intermediate frequency.

5. The method according to claim 1, wherein the carrier frequency is varied in the carrier frequency varying step by a sudden frequency change method.

6. A radar device comprising:

a first arrangement configured to transmit signals with a carrier frequency;

a second arrangement configured to pulse the signals with a pulse repetition frequency;

a third arrangement configured to vary the pulse repetition frequency during operation of the radar device, wherein the third arrangement is configured to vary the pulse repetition frequency chaotically; and a fourth arrangement configured to vary the carrier frequency during operation of the radar device.

7. The radar device according to claim 6, wherein the fourth arrangement is configured to vary the carrier frequency by phase modulation.

8. The radar device according to claim 6, wherein the fourth arrangement is configured to vary the carrier frequency by frequency modulation, the radar device further comprising:

a fifth arrangement configured to create a virtual intermediate frequency by mixing a received signal with the modulated carrier frequency; and a sixth arrangement configured to analyze the received signal at the virtual intermediate frequency.

9. The radar device according to claim 6, the fourth arrangement is configured to vary the carrier frequency by a sudden frequency change method.

* * * * *